(12) United States Patent
Friedel et al.

(10) Patent No.: US 8,394,885 B2
(45) Date of Patent: Mar. 12, 2013

(54) COMPOSITION FOR BUILDING PROTECTION APPLICATIONS BASED ON ALKYLALKOXY-SILOXANES HAVING IMPROVED WATER REPELLENCY PROPERTIES

(75) Inventors: Manuel Friedel, Zurich (CH);
Spomenko Ljesic, Rheinfelden (DE);
Sabine Giessler-Blank, Dortmund (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/055,886

(22) PCT Filed: Jun. 3, 2009

(86) PCT No.: PCT/EP2009/056807
§ 371 (c)(1),
(2), (4) Date: Jan. 28, 2011

(87) PCT Pub. No.: WO2010/012535
PCT Pub. Date: Feb. 4, 2010

(65) Prior Publication Data
US 2011/0124794 A1    May 26, 2011

(30) Foreign Application Priority Data
Jul. 28, 2008  (DE) .......................... 10 2008 040 783

(51) Int. Cl.
*C08L 83/00* (2006.01)
*C08K 5/24* (2006.01)
(52) U.S. Cl. ........................................ 524/506; 524/261
(58) Field of Classification Search .................... 524/506
See application file for complete search history.

(56) References Cited

U.S. PATENT DOCUMENTS 4,751,114 A * 6/1988 Homma et al. ............ 427/407.1
5,300,239 A * 4/1994 Ozaki et al. .................... 8/127.1
5,990,212 A * 11/1999 Hager et al. ................... 524/269
6,319,557 B1 * 11/2001 Ikushima et al. .......... 427/385.5
6,858,746 B2    2/2005 Giessler et al.
7,578,877 B2    8/2009 Giessler et al.
7,598,409 B2   10/2009 Just et al.
7,666,257 B2    2/2010 Giessler-Blank et al.
7,670,422 B2    3/2010 Giessler-Blank et al.
7,939,618 B2 *  5/2011 Schildbach et al. ............ 528/38
2009/0005518 A1  1/2009 Just et al.
2010/0041629 A1  2/2010 Giessler-Blank et al.
2010/0119851 A1  5/2010 Giessler-Blank et al.

FOREIGN PATENT DOCUMENTS

EP    0 472 215    2/1992
EP    0 826 650    3/1998

OTHER PUBLICATIONS

International Search Report issued Oct. 6, 2009 in PCT/EP09/56807 filed Jun. 3, 2009.
U.S. Appl. No. 61/089,079, filed Aug. 15, 2008, Giessler-Blank, et al.
U.S. Appl. No. 13/062,225, filed May 16, 2011, Weissenbach, et al.
U.S. Appl. No. 13/147,712, filed Aug. 3, 2011, Friedel, et al.

\* cited by examiner

Primary Examiner — David W Wu
Assistant Examiner — Hui Chin
(74) *Attorney, Agent, or Firm* — Oblon, Spivak, McClelland, Maier & Neustadt, L.L.P.

(57) ABSTRACT

The present invention relates to a composition for imparting water repellency to porous mineral substrates and for producing a water repellency effect on the surface of the substrate and to a process for the preparation of such a composition, said composition being based on
 at least one silane oligomer,
 at least one hydrolysis or condensation catalyst,
 at least one fluorine-containing polymer,
 optionally water and/or at least one organic solvent,
 optionally at least one emulsifier and
 optionally further auxiliaries.

17 Claims, No Drawings

COMPOSITION FOR BUILDING PROTECTION APPLICATIONS BASED ON ALKYLALKOXY-SILOXANES HAVING IMPROVED WATER REPELLENCY PROPERTIES

The present invention relates to a composition for imparting water repellency to porous mineral substrates based on alkylalkoxysiloxanes having improved water repellency properties, the preparation thereof and the use thereof for the protection of buildings. Alkylalkoxysiloxanes are also referred to for short below as (water repellent) active substance or as oligomeric silane systems or silane oligomers.

It has long been known that silane compounds carrying alkyl chains can produce water repellency properties on porous mineral substrates. Thus, in particular monomeric, short-chain alkylalkoxysilanes are distinguished by good deep impregnation (EP 0 101 816).

Oligomeric silane systems, such as alkylalkoxysiloxanes, have advantages with regard to their use as water repellents since they release less volatile organic compounds (VOC) than monomeric silane systems during use.

The hydrolysis and setting rate of such oligomeric silane systems is lower than the comparable monomeric systems (E. P. Plueddemann, Silane Coupling Agents, Plenum Press, New York, 1991). However, the rate of the setting reaction of such building protection compositions can be improved by the addition of suitable hydrolysis and condensation catalysts.

Furthermore, it is known that building protection compositions can be used in the form of a solution or a liquid or pasty or creamy, i.e. high-viscosity, emulsion (inter alia EP 0 814 110, EP 1 205 481, EP 1 205 505, WO 06/081892).

A quality feature of water repellents which is frequently desired by users is the repulsion of water drops on the surface of a water repellent substrate (referred to as water repellency effect for short).

Unfortunately, after application to a porous mineral substrate, the above-mentioned building protection compositions prevent the penetration of water (water repellency) yet no water repellency properties or only very slight water repellency properties are achieved.

U.S. Pat. No. 4,846,886 relates to a water-repellent composition for the treatment of porous substrates, the composition containing, inter alia, an alkylalkoxysilane, a mixture of alcohol, benzine hydrocarbons and glycol ether as a carrier, a metal salt as a catalyst and a substance which produces a water repellency effect on application of the composition, this substance being selected from the series consisting of amino salt-functionalized siloxane copolymers, silicone rubber, methylsilicones or a trifluoropropyl-functionalized methylsilicone. Water repellency properties achievable in this manner are also not sufficiently pronounced for most users.

WO 06/081891 teaches that a building protection emulsion as a water repellency auxiliary can contain a fluoropolymer. These emulsions have the disadvantage that the efficiency is poorer on substrates of low alkalinity.

EP 0 826 650 discloses aqueous emulsions which contain fluorine-containing polymers. A disadvantage of the formulations described is that the hydrolysis and setting reaction is too slow and several days are required before the water repellency effect has fully developed.

In addition, it is known that foam formation can occur when additives are mixed into aqueous or organic systems, which foam formation is often troublesome during operation in practice. Fluorine-containing polymers can stabilize foams and are therefore used, for example, for stabilizing fire-extinguishing foams (WO 2008/027604). This foam formation can be prevented, for example, by addition of suitable antifoams. However, the addition of a further ingredient constitutes an additional cost factor.

It was therefore the object of the present invention to improve the water repellency properties of alkylsiloxane-based compositions for building protection applications. At the same time, it was desired to obtain as far as possible the deep impregnation properties of the active substances. Furthermore, it was a concern of the present invention as far as possible to reduce the foam formation during the preparation of such a composition.

According to the invention, the object is achieved in accordance with the information in the patent claims. The claims presented here are therefore simultaneously also to be regarded as part of the description.

Surprisingly, it was found that a substantially improved water repellency effect can be achieved in an advantageous manner by specific admixing of at least one water repellency auxiliary from the series consisting of the fluorine-containing polymers to an alkylalkoxysiloxane-based composition for imparting water repellency to porous mineral substrates.

In the present invention, foam formation can thus also advantageously be very substantially avoided in a simple and economical manner.

In addition, the compositions according to the invention are distinguished by a very good reduction of the water absorption of a substrate treated therewith and a large depth of penetration in combination with outstanding water repellency properties and a sufficiently fast setting reaction.

In this context, compositions according to the invention can particularly advantageously be used for imparting water repellency to porous mineral substrates, preferably silicate materials, in particular building materials, such as concrete, fibre cement, clay, brick, marble, granite, sandstone or lime sandstone, to mention but a few examples.

Thus, compositions according to the invention may be present and can be applied as such, as a solution in organic solvents and as aqueous emulsions.

Furthermore, compositions according to the invention can advantageously be adjusted to a desired concentration of active substance with a suitable solvent or diluent.

Preferred solvents or diluents which are used are organic solvents suitable for this purpose, for example—but not exclusively—aliphatic and aromatic hydrocarbons having a boiling point above room temperature, such as $C_6$- to $C_{12}$-alkanes, benzine, petroleum ether, diesel, kerosene, toluene, xylene, alcohols or polyols, such as methanol, ethanol, isopropanol, tert-butanol, pentanol, hexanol, octanol, nonanol, isononanol, glycerol, ketones, such as acetone, or a mixture of at least two of the abovementioned organic solvents.

However, a solvent may also be water.

The present invention relates to a composition for imparting water repellency to porous mineral substrates and for producing a water repellency effect on the surface of the substrate, the composition being based on
 at least one silane oligomer,
 at least one hydrolysis or condensation catalyst,
 at least one fluorine-containing polymer,
 optionally water and/or at least one organic solvent,
 optionally at least one emulsifier and
 optionally further auxiliaries.

The composition according to the invention is preferably an emulsion.

Said alkylalkoxysiloxanes (also referred to as active substance and constituent of the oil phase in an aqueous emulsion) can advantageously be selected from the silane oligomers or corresponding oligomer mixtures of the idealized formula I

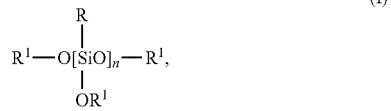 (I)

in which R, independently of one another, is $C_1$-$C_{18}$-alkyl, groups $R^1$ are identical or different and $R^1$ is a hydrogen atom or an alkyl radical having 1 to 6 carbon atoms, preferably having 1 or 2 carbon atoms, and n determines the degree of oligomerization, this being 2 to 40, preferably 2 to 20. These are advantageously oligomer mixtures having an average degree of oligomerization of 3 to 20, preferably of 4 to 6, the average molar mass preferably being $\leq 1200$ g/mol, in particular 400 to 1200 g/mol. The silane oligomers may be present as linear, cyclic and/or branched units.

Preferred examples of silane oligomers are those having the radicals:
R=$CH_3$—, $C_2H_5$—, $C_3H_7$—, $C_4H_9$—, i-$C_4H_9$—, $C_6H_{13}$—, i-$C_6H_{13}$—, $C_8H_{16}$—, i-$C_8H_{16}$— and $R^1$=H, methyl or ethyl.

Furthermore, compositions according to the invention are advantageously distinguished by a content of active substance of 1 to 98% by weight, preferably 2 to 85% by weight, particularly preferably 3 to 80% by weight, very particularly preferably 5 to 75% by weight, in particular 8 to 50% by weight, based on the composition.

Furthermore, compositions according to the invention advantageously contain at least one hydrolysis or condensation catalyst from the series consisting of the complex compounds, such as halides, oxides, hydroxides, imides, alcoholates, amides, thiolates, carboxylates and/or combinations of these substituents, of elements of the 3rd and 4th main groups of the Periodic Table of the Elements (PTE) and of the subgroups II, III, IV, V, VI, VII and VIIIa, VIIIb and VIIIc of the PTE, in particular titanates or zirconates, such as, for example, tetra-n-butyl orthotitanate or tetra-n-propyl orthozirconate. In addition, oxides, hydroxides, hydrogen phosphates, hydrogen sulphates, sulphides, hydrogen sulphides, carbonates or bicarbonates of the 1st and 2nd main groups of the PTE and/or alcoholates, preferably sodium methanolate or sodium ethanolate and/or amino alcohols, preferably 2-aminoethanol or 2-(N,N-dimethyl)aminoethanol, may be used. Finally, carboxylic acids, such as formic acid, acetic acid or propionic acid, and mineral acids, such as hydrochloric acid or phosphoric acid, may be used.

Suitably, the content of catalyst in the present composition is 0.1 to 3% by weight, preferably 0.1 to 2% by weight, particularly preferably 0.5 to 1.5% by weight, based on the active substance.

In particular, compositions according to the invention having substantially improved water repellency properties are distinguished by a content of at least one fluorine-free or fluorine-containing polymer.

Preferred fluorine-containing polymers contain fluorine in organically bound form, in particular in the form of bivalent $CF_2$ and monovalent $CF_3$ groups. The fluorine-containing polymers used may contain further elements, such as hydrogen, nitrogen, phosphorus, oxygen, sulphur, chlorine, bromine and/or iodine, in bound form, in addition to C and F. Fluorine-containing polymers used according to the invention may be homopolymers, copolymers or terpolymers, it being necessary for at least one of the parent monomers to contain $CF_2$ groups in the case of copolymers and terpolymers. Monomers containing $CF_2$ groups may be, for example, tetrafluoroethylene, trifluorochloroethylene, hexafluoropropylene, vinylidene fluoride, 1,1-dihydroperfluorobutyl acrylate.

Particularly preferred according to the invention are fluorine-containing polymers of the general formula II

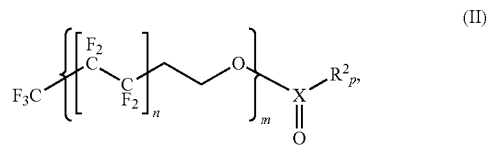 (II)

in which, independently of one another,
X is C, P or S,
$R^2$ is —H, —OH, —$CH_3$, —$C_2H_4$, —CH=$CH_2$, —C(—$CH_3$)=$CH_2$,

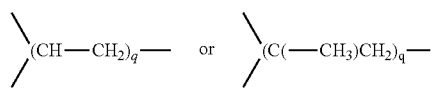

where q=2 to 200,
m is 1, 2 or 3,
n is 1 to 100, and
p is 0, 1 or 2, with the precondition that m+p=2 if X=C, m+p=3 if X=P, and m+p=2
if X=S.

According to the invention, copolymers and terpolymers of a compound according to the abovementioned formula with, for example, ethylene, propylene, vinyl chloride, vinyl acetate or methacrylate, such as methyl methacrylate, are moreover preferred as fluorine-containing polymers. Thus, for example, fluorine-containing copolymers of the general formula III

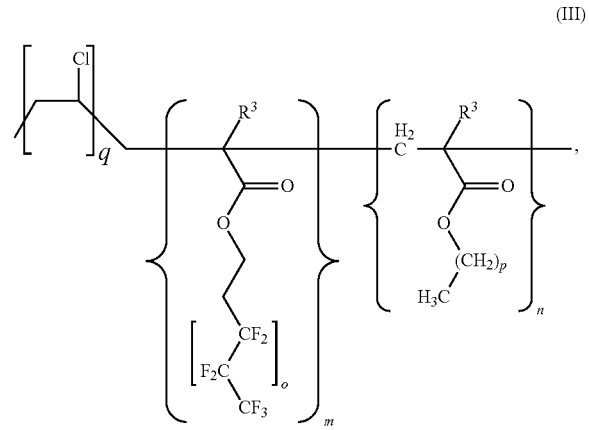 (III)

in which, independently of one another,
$R^3$ is —H, —$CH_3$,
m is 1 to 200,
n is 0 to 200,
o is 1 to 100,
p is 1 to 100 and
q is 0 to 100,
are preferred.

A content of fluorine-containing polymers (in the present invention, the term polymers includes copolymers and terpolymers) of 0.5 to 6% by weight, particularly preferably 1 to 5% by weight, in particular 2 to 4% by weight, based on the composition, is preferred in a composition according to the invention.

If the composition according to the invention is present in the form of an aqueous emulsion, this may contain at least one emulsifier which is advantageously selected from the series consisting of the alkylsulphates having $C_8$-$C_{18}$-alkyl, alkyl and alkaryl ether sulphate having $C_8$-$C_{18}$-alkyl in the hydrophobic radical and having 1 to 40 ethylene oxide (EO) or propylene oxide (PO) units, alkylsulphonates having $C_8$-$C_{18}$-alkyl, alkarylsulphonates having $C_8$-$C_{18}$-alkyl, and monoesters of sulphosuccinic acid with monohydric alcohols or alkylphenols having 5 to 15 carbon atoms, alkali metal and ammonium salts of carboxylic acids having 8 to 20 carbon atoms in the alkyl, aryl, alkaryl or aralkyl radical, alkyl and alkaryl phosphates having 8 to 20 carbon atoms in the organic radical, alkyl ether or alkaryl ether phosphates having 8 to 20 carbon atoms in the alkyl or alkaryl radical and 1 to 40 EO units, alkylpolyglycol ethers and alkarylpolyglycol ethers having 8 to 40 EO units and $C_8$-$C_{20}$-carbon atoms in the alkyl or aryl radicals, ethylene oxide/propylene oxide (EO/PO) block copolymer having 8 to 40 EO or PO units, adducts of alkylamines having $C_8$-$C_{22}$-alkyl radicals with ethylene oxide or propylene oxide, alkylpolyglycosides having linear or branched saturated or unsaturated $C_8$-$C_{24}$-alkyl radicals and oligoglycoside radicals having 1 to 10 hexose or pentose units, silicon-functional surfactants or mixtures of these emulsifiers.

The content of the emulsifier in such a composition according to the invention is preferably 0.01 to 5% by weight, based on the total weight of the emulsion.

In addition, a composition according to the invention can advantageously also contain customary auxiliaries selected from inorganic or organic acids, buffer substances, fungicides, bactericides, algicides, microbicides, odorous substances, corrosion inhibitors, preservatives, rheology auxiliaries.

In general, a composition according to the invention can be prepared as follows:

The preparation of the silane oligomers can advantageously be effected according to EP 0 814 110, EP 1 205 481, EP 1 205 505. The abovementioned documents are thus part of the present description in their entirety.

The solvent-containing compositions according to the invention can be prepared by simple mixing of the individual components in a container by means of a suitable mixing unit. This mixing can be effected continuously, for example by using a mixing tube, or batchwise.

The sequence of addition is advantageously such that first an amount of the solvent to be used is initially introduced, which permits the stirred unit to be operated, and the fluorine-containing polymers according to the invention, catalysts, additives and finally the silane oligomers according to the invention are dissolved in sequence in this amount. The remaining amount of solvent can be added to the mixture after addition of the fluorine-containing polymers or as the last component.

Furthermore, it is advantageously possible to dissolve the catalysts to be used according to the invention in the silanol oligomers to be used according to the invention and to introduce this solution, as described above, together with the further additives, into the solvents.

By maintaining a specific metering sequence of the components, the compositions according to the invention can advantageously be obtained with greatly reduced foam formation and without the addition of an antifoam.

For this purpose, according to the invention, a procedure is adopted in which 5 to 70% by weight, preferably 10% by weight, of the solvent or solvent mixture to be used are preferably initially introduced into a tank having a stirrer unit, in particular a glass or stainless steel container, and the fluorine-containing polymer is added at preferably a low speed of the stirrer motor, particularly preferably at 10 to 100 revolutions per minute. The remaining amount of solvents is then metered, preferably with stirring at unchanged speed. This can be effected in portions or continuously, if desired all at once. Thereafter, the catalyst is added to the silane oligomer, optionally as an aqueous emulsion, and the mixture thus obtained is metered into the mixture of solvent and fluorine-containing polymer, already prepared beforehand, at a comparatively low speed, preferably at the same speed, of the stirrer motor. Further auxiliaries and, if required, additional emulsifier can then be metered in. Finally, the stirrer speed (subsequent stirring) is increased preferably by a factor of 1.1 to 1000, in particular 10, in order to ensure homogeneous mixing. Stirring is preferably continued for 1 to 30 minutes.

It is advantageous to ensure that stirring in of air and hence greater foam formation are avoided.

The preparation of an aqueous emulsion is described in detail from the technical point of view, for example in WO 06/081892 and WO 06/081891. The abovementioned documents are therefore part of the present description in their entirety.

For the preparation of an emulsion having a composition according to the invention, the fluorine-containing polymers to be used according to the invention and/or catalysts can either be dissolved in the aqueous phase together with the other ingredients, such as the emulsifiers to be used according to the invention, or can be predispersed and then emulsified with the silane oligomers. Alternatively, the fluorine-containing polymers to be used according to the invention and/or catalysts can be metered together with the silane oligomers into the aqueous base mixture and then emulsified. Finally, the aqueous emulsions according to the invention can be obtained by simple mixing of the fluorine-containing polymers and/or catalysts with previously prepared, aqueous emulsion in a container having a suitable mixing unit. This mixing can be effected continuously, for example by using a mixing tube, or batchwise.

Moreover, the content of silane oligomer in the oil phase can be advantageously adjusted by addition of a suitable organic solvent, for example—but not exclusively—aliphatic and aromatic hydrocarbons having a boiling point above room temperature, such as $C_6$- to $C_{12}$-alkanes, benzine, petroleum ether, diesel, kerosene, toluene, xylene, alcohols or polyols, such as pentanol, hexanol, octanol, nonanol, isononanol, glycerol, ketones or a mixture of at least two of the abovementioned organic solvents.

The present invention therefore relates to a process for the preparation of a composition according to the invention while avoiding pronounced foam formation, by
- initially introducing 5 to 70% by weight of the solvent to be used,
- stirring in the fluorine-containing polymer,
- then adding the remaining amount of solvent,
- subsequently metering a mixture of at least one silane oligomer and catalyst with stirring,
- optionally adding emulsifier and/or auxiliaries and
- stirring further and/or emulsifying.

Thus, the present invention also relates to a composition, in particular an emulsion, which is obtainable by the process according to the invention.

The present invention furthermore relates to the use of a composition according to the invention or of a composition prepared by the process according to the invention for imparting water repellency to porous mineral substrates, in particular building materials, such as concrete, fibre cement, clay, brick, marble, granite, sandstone or lime sandstone, and for producing a water repellency effect on the treated substrate surface, water drops which remain on the treated substrate surface over a time of 1 minute virtually not wetting the surface and thus advantageously not leaving behind any wetting spots detectable with the naked eye.

The invention is illustrated in more detail with reference to the following examples, which however do not limit the subject of the invention.

EXAMPLES

All data below in % by weight are based on the total mass of the final formulation.

Component 1:

1a: 49% strength aqueous emulsion of an oligomerized alkyltrialkoxysilane (Protectosil® WS 600 from Evonik Degussa GmbH).

1b: Oligomerized alkyltrialkoxysilane (Protectosil® 266 from Evonik Degussa GmbH).

1c: Oligomerized n-propyltriethoxysilane and catalyst:

1.8 g of tetra(n-propoxy)zirconate (Tyzor NPZ from DuPont) are added to 200 g of the compound 1b with vigorous stirring.

Component 2:

2a: 20-40% strength dispersion of Telomer B phosphate diethanolamine salts, containing difluoromethylene groups, in a mixture of water (35-45%) and isopropanol (20-30%) (Zonyl® 9027 from DuPont).

2b: 10-20% strength solution of a resin containing polyacrylates having fluorinated side chains in a hydrocarbon mixture (Unidyne TG 656 from Daykin Industries).

2c: Oligomerized 3,3,3-trifluoropropylmethyldimethoxysilane. The oligomer is obtainable according to EP 0814110.

2d: Fluorinated copolymer with 25% of dry substance dissolved in a hydrocarbon mixture (Zonyl® 210 from DuPont).

Example 1

Comparative Example

At room temperature, 1b was initially introduced into a clean, dry glass vessel and diluted in the mass ratio 1:4 with the hydrocarbon mixture Shellsol D60 (obtainable from Shell Chemicals). The mixture formed was stirred for a further 10 minutes and could then be used directly.

Example 2

Comparative Example

At room temperature, 1b was initially introduced into a clean, dry glass vessel and diluted in the mass ratio 1:9 with the hydrocarbon mixture Shellsol D60 (obtainable from Shell Chemicals). 3% by weight of 2a were added with slow stirring on a magnetic stirrer. The mixture formed was stirred for a further 10 minutes and could then be used directly.

Example 3

Comparative Example

At room temperature, propyltriethoxysilane was diluted in the mass ratio 1:4 with the hydrocarbon mixture Shellsol D60 (obtainable from Shell Chemicals). 5% by weight of 2c and 1% by weight of tetraisopropyl titanate are added to this solution. The mixture is stirred for a further 10 minutes on the magnetic stirrer and then used directly.

Example 4

Comparative Example

At room temperature, 1a was initially introduced into a clean, dry glass vessel. The mixture formed was diluted in the mass ratio 1:4 with demineralized water and stirred for a further 10 minutes and could then be used directly.

Example 5

At room temperature, 8% by weight of demineralized water were initially introduced into a clean, dry glass vessel. 2% by weight of 2a were added with slow stirring on a magnetic stirrer and then 70.4% by weight of demineralized water were added. Finally, 19.6% by weight of 1a were added to the mixture formed and the mixture was stirred for a further 10 minutes and could then be used directly.

Example 6

At room temperature, 9% by weight of Shellsol D60 (obtainable from Shell Chemicals) were initially introduced into a clean, dry glass vessel and 3% by weight of 2b were added with slow stirring by means of a magnetic stirrer. Thereafter, 78% by weight of Shellsol D60 followed by 10% by weight of 1c were added with further slow stirring. The mixture formed was stirred for a further 10 minutes and could then be used directly.

Example 7

At room temperature, 9% by weight of n-heptane were initially introduced into a clean, dry glass vessel and 3% by weight of 2d were added with slow stirring by means of a magnetic stirrer. Thereafter, 78% by weight of n-heptane followed by 10% by weight of 1c were added with further slow stirring. The mixture formed was stirred for a further 10 minutes and could then be used directly.

Evaluation of the Examples

Table 1 below lists the results of the abovementioned examples.

For this purpose, the concrete panels and lime sandstone panels having the dimensions 15×7.5×1 cm were treated by immersion with ready-to-use solutions with the application rate stated in each case. For the determination of the quality of the water repellency properties, water drops were placed on top and, unless they have been absorbed, the contact angle was determined after a contact time of 1 minute. In addition, the drops were wiped off after a contact time of 10 minutes and the remaining surface was assessed (spot formation: 0=drops repelled, 1=no wetting, 2=contact surface half wetted, 3=contact surface fully wetted, 4=dark coloration of the contact surface, drops partly absorbed, 5=dark coloration of the contact surface, drops 50% absorbed, 6=dark coloration of the contact surface, drops completely absorbed).

The water repellency properties are expressed by the reduction of the water absorption of the individual mixtures. For this purpose, concrete and lime sandstone cubes having an edge length of 5 cm were treated with the stated amount by immersion. After a setting time of 2 weeks, the treated cubes were stored completely under water for 24 h. The weight increase was then determined. The reduction of the water absorption is obtained in comparison to an untreated cube.

TABLE 1

Results of the tests (n.d.: not determined)

| Mixture from example | Substrate | Application rate | Contact angle after 1 minute | Spot formation after 10 minutes | Reduction of water absorption |
|---|---|---|---|---|---|
| 1 | Concrete | 187 g/m² | 64° | 4 | 84% |
| 2 | Concrete | 173 g/m² | 104° | 4 | 92% |
| 3 | Concrete | 173 g/m² | 105° | 2 | 91% |
| 4 | Concrete | 190 g/m² | 95° | n.d. | 16% |
| 5 | Concrete | 213 g/m² | 101° | 2 | 75% |
| 6 | Concrete | 173 g/m² | 119° | 1 | 84% |
| 7 | Concrete | 187 g/m² | 124° | 1 | 92% |
| 1 | Lime sandstone | 247 g/m² | n.d. | 3 | 96% |
| 2 | Lime sandstone | 213 g/m² | 115° | 3 | 95% |
| 3 | Lime sandstone | 227 g/m² | n.d. | 1 | 96% |
| 4 | Lime sandstone | 187 g/m² | 112° | 2 | 80% |
| 5 | Lime sandstone | 280 g/m² | 122° | 1 | 94% |
| 6 | Lime sandstone | 235 g/m² | 121° | 0 | 95% |
| 7 | Lime sandstone | 220 g/m² | 139° | 0 | 94% |

CONCLUSION

The compositions according to the invention show greatly improved water repellency properties both on concrete and on lime sandstone. The desired water repellency properties are completely retained.

The invention claimed is:

1. A composition, comprising:
(a) a silane oligomer, comprising an alkylalkoxysiloxane of idealized formula (I)

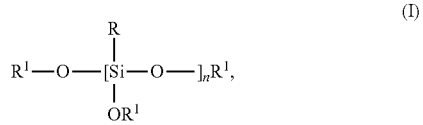

$$R^1-O-[Si(R)(OR^1)-O-]_n R^1, \quad (I)$$

wherein
n is a number from 1 to 40,
R independently of one another, is a $C_1$-$C_{18}$-alkyl group,
$R^1$ are, independently of one another, a hydrogen atom or an alkyl radical comprising 1 to 6 carbon atoms;
(b) a hydrolysis or condensation catalyst;
(c) a fluorine-comprising polymer; and
(e) at least one emulsifier selected from the group consisting of
an alkyl sulfate comprising a $C_8$-$C_{18}$-alkyl,
an alkyl ether sulfate comprising a $C_8$-$C_{18}$-alkyl in the hydrophobic radical and 1 to 40 ethylene oxide (EO) or propylene oxide (PO) units,
an alkaryl ether sulfate comprising a $C_8$-$C_{18}$-alkyl in the hydrophobic radical and 1 to 40 ethylene oxide (EO) or propylene oxide (PO) units,
an alkyl sulfonate comprising a $C_8$-$C_{18}$-alkyl,
an alkaryl sulfonate comprising a $C_8$-$C_{18}$-alkyl,
a monoester of sulfosuccinic acid with a monohydric alcohol comprising 5 to 15 carbon atoms,
a monoester of sulfosuccinic acid with a monohydric alkylphenol comprising 5 to 15 carbon atoms,
an alkali metal salt of a carboxylic acid comprising 8 to 20 carbon atoms in the alkyl, aryl, alkaryl, or aralkyl radical,
an ammonium salt of a carboxylic acid comprising 8 to 20 carbon atoms in the alkyl, aryl, alkaryl, or aralkyl radical,
an alkyl phosphate comprising 8 to 20 carbon atoms in the organic radical,
an alkaryl phosphate comprising 8 to 20 carbon atoms in the organic radical,
an alkyl ether phosphate comprising 8 to 20 carbon atoms in the alkyl radical and 1 to 40 EO units,
an alkaryl ether phosphate comprising 8 to 20 carbon atoms in the alkaryl radical and 1 to 40 EO units,
an alkylpolyglycol ether comprising 8 to 40 EO units and $C_8$-$C_{20}$-carbon atoms in the alkyl radicals,
an alkarylpolyglycol ether comprising 8 to 40 EO units and $C_8$-$C_{20}$-carbon atoms in the alkyl or aryl radicals,
an ethylene oxide/propylene oxide (EO/PO) block copolymer comprising 8 to 40 EO or PO units,
an adduct of an alkylamine comprising a $C_8$-$C_{22}$-alkyl radical with ethylene oxide or propylene oxide,
an alkylpolyglycoside comprising a linear or branched saturated or unsaturated $C_8$-$C_{24}$-alkyl radical and an oligoglycoside radical comprising 1 to 10 hexose or pentose units, and
a silicon-functional surfactant,
wherein the catalyst (b) comprises (b1) a salt of at least one selected from the group consisting of an element of the 1st main group of the periodic table of elements, an element of the 2nd main group of the periodic table of elements, an alcoholate, an amino alcohol, a carboxylic acid, and a mineral acid, or (b2) sodium methanolate, sodium ethanolate, 2-aminoethanol, 2-(N,N-dimethyl) aminoethanol, a titanate, or a zirconate, and
wherein an average molecular weight of the silane oligomer is ≦1200 g/mol.

2. The composition of claim 1, wherein a content of the silane oligomer (a) is 1 to 98% by weight, based on the composition.

3. The composition of claim 1, further comprising:
(d) at least one solvent or diluent selected from the group consisting of water,
an aliphatic hydrocarbon having a boiling point above room temperature,
an aromatic hydrocarbon having a boiling point above room temperature,
gasoline,
petroleum ether,
diesel,
kerosene,
toluene,
xylene,
an alcohol,
a polyol, and
a ketone.

4. The composition of claim 1, wherein a content of the catalyst (b) is 0.1 to 3% by weight, based on an amount of the silane oligomer.

5. The composition of claim 1, wherein the fluorine-comprising polymer (c) comprises at least one selected from the group consisting of a fluorine-comprising polymer, a fluorine-comprising copolymer, and a fluorine-comprising terpolymer,
wherein the fluorine-comprising polymer (c) comprises at least one $CF_2$ group or one $CF_3$ group.

6. The composition of claim 1, wherein the fluorine-comprising polymer (c) comprises:
(c1) a fluorine-comprising polymer of formula (II)

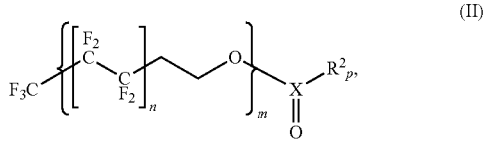

wherein
X is C, P, or S,
$R^2$ is —H, —OH, —$CH_3$, —$C_2H_4$, —CH=$CH_2$, —C(—$CH_3$)=$CH_2$, >(CH—$CH_2$)$_q$— or >(C(—$CH_3$)$CH_2$)$_q$— where q=2 to 200,
m is 1, 2, or 3,
n is 1 to 100, and
p is 0, 1, or 2,
with the precondition that m+p=2 if X=C or S, and m+p=3 if X=P, or
(c2) a fluorine-comprising polymer of formula (III)

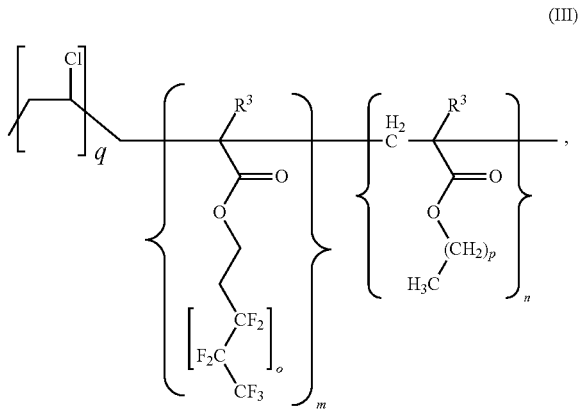

wherein
$R^3$ is —H or —$CH_3$,
m is 1 to 200,
n is 0 to 200,
o is 1 to 100,
p is 1 to 100, and
q is 0 to 100.

7. The composition of claim 1, wherein a content of the fluorine-comprising polymer is 0.5 to 6% by weight, based on the composition.

8. The composition of claim 1, wherein a content of the emulsifier (e) is 0.01 to 5% by weight, based on a total weight of the composition.

9. The composition of claim 1, further comprising:
(f) at least one auxiliary selected from the group consisting of an inorganic acid, an organic acid, a buffer substance, a fungicide, a bactericide, a algicide, a microbicide, an odorous substance, a corrosion inhibitor, a preservative, and a rheology auxiliary.

10. A process for preparing of the composition of claim 1, comprising:
(i) initially introducing 5 to 70% by weight of a solvent;
(ii) stirring in the fluorine-comprising polymer;
(iii) adding remaining amount of solvent;
(iv) subsequently metering in a mixture of at least one silane oligomer and catalyst with stirring;
(v) adding an emulsifier and, optionally, an auxiliary; and
(vi) stirring further, emulsifying, or stirring further and emulsifying.

11. The composition of claim 3, wherein the solvent or diluent (d) comprises a $C_6$- to $C_{12}$-alkane.

12. The composition of claim 1, wherein the catalyst (b) comprises a salt of at least one selected from the group consisting of an element of the 1st main group of the periodic table of elements, an element of the 2nd main group of the periodic table of elements, an alcoholate, an amino alcohol, a carboxylic acid, and a mineral acid.

13. The composition of claim 1, wherein the catalyst (b) is sodium methanolate or sodium ethanolate.

14. The composition of claim 1, wherein the catalyst (b) is 2-aminoethanol or 2-(N,N-dimethyl)aminoethanol.

15. The composition of claim 1, wherein the catalyst (b) is a titanate or a zirconate.

16. A method of repelling water, comprising:
treating a surface of a substrate with the composition of claim 1, to obtain a treated substrate,
wherein when a water drop remains on the treated substrate surface for 10 minutes, it does not produce a wet spot.

17. The composition of claim 1, wherein the catalyst (b) is a Zr or Ti tetraalcoholate.

* * * * *